US008163811B2

(12) United States Patent
Quante et al.

(10) Patent No.: US 8,163,811 B2
(45) Date of Patent: Apr. 24, 2012

(54) FIRE RETARDANT ELASTIC FOAM MATERIAL

(75) Inventors: Heribert Quante, Marienmuenster (DE); Jürgen Weidinger, Muenster (DE); Christoph Zauner, Muenster (DE)

(73) Assignee: Armacell Enterprise GmbH, Muenster (DE)

( * ) Notice: Subject to any disclaimer, the term of this patent is extended or adjusted under 35 U.S.C. 154(b) by 141 days.

(21) Appl. No.: 12/783,157

(22) Filed: May 19, 2010

(65) Prior Publication Data

US 2010/0311855 A1 Dec. 9, 2010

(30) Foreign Application Priority Data

Jun. 4, 2009 (EP) .................................... 09007437

(51) Int. Cl.
*C08F 36/18* (2006.01)
*C08J 9/00* (2006.01)
*C08K 5/02* (2006.01)
(52) U.S. Cl. ........... 521/150; 521/50; 521/142; 524/464
(58) Field of Classification Search .................. 521/150, 521/50, 142; 524/464
See application file for complete search history.

(56) References Cited

U.S. PATENT DOCUMENTS

| 2,894,926 | A | | 7/1959 | Jacobson |
| 3,565,748 | A | | 2/1971 | Palmer et al. |
| 4,329,499 | A | * | 5/1982 | Horstmann et al. ............ 564/81 |
| 4,632,865 | A | | 12/1986 | Tzur |
| 5,719,199 | A | | 2/1998 | Wallace et al. |

FOREIGN PATENT DOCUMENTS

| DE | 3410889 A1 | 2/1986 |
| DE | 4135678 A1 | 5/1993 |
| EP | 1469059 A2 | 10/2004 |
| EP | 1970403 A1 | 9/2008 |
| GB | 977929 | 12/1964 |
| GB | 521764 | 12/1999 |
| JP | 60186543 A | 9/1985 |
| JP | 60186544 A | 9/1985 |
| JP | 61272248 A | 12/1986 |
| JP | 62167334 A | 7/1987 |
| JP | 1182030 A | 7/1989 |
| JP | 6041341 A | 2/1994 |
| JP | 10060151 A | 3/1998 |
| JP | 10077478 A | 3/1998 |
| JP | 11346416 A | 12/1999 |
| UA | 61419 A | 11/2003 |
| UA | 78131 C2 | 2/2007 |

OTHER PUBLICATIONS

EP Search Report in related application No. EP 09007437 dated Nov. 4, 2009, 6 pages.
Hornsby et al.: "Flame Retardance and Smoke Suppression of Polychloroprene Containing Inorganic Tin Compounds," Polymer Degradation and Stability, vol. 32, 1991, pp. 299-312.
Database WPI Week 19962, Thomson Scientific, London, GB, May 10, 1995, 2 pages.
Database WPI Week 200027, Thomson Scientific, London, GB, Jun. 10, 1999, 1 page.

* cited by examiner

*Primary Examiner* — Timothy J. Kugel
(74) *Attorney, Agent, or Firm* — Rothwell, Figg, Ernst & Manbeck, P.C.

(57) ABSTRACT

The present invention relates to an expandable and crosslinkable elastomeric material with improved fire retardant properties and low smoke generation, the manufacturing and use of the material. The material includes polychloroprene as a main polymeric ingredient and chloroparaffin and which is expanded to a final density of less than 200 kg/m$^3$.

13 Claims, No Drawings

FIRE RETARDANT ELASTIC FOAM MATERIAL

BACKGROUND OF THE INVENTION

1. Field of the Invention

The present invention relates to an expandable and crosslinkable elastomeric material with improved fire retardant properties and low smoke generation, the process for manufacturing of such material and the use of such material.

2. Description of the Background Art

Fire retardancy and the issues conjugated herewith play an important role in the field of elastomer development. Many efforts have been taken to select and produce fire retardant rubber bases, with prominent examples, such as PVC or chloroprene (CR). The latter has often been used as fire retardant adhesive (e.g. JP 11346416), coating (e.g. DE 2453238) or as impregnation for the same purpose (e.g. JP 62167334). An extraordinary challenge is to render elastomeric foams fire retardant or at least less flammable as the air included in the foam cells and the thin cell walls will accelerate flame spread. Chloroprene has been used also here to reduce flammability, such as impregnation of existing foams (e.g. GB 977929) or as foamed CR latices, emulsions and such (e.g. JP 61272248, JP 10060151, the latter also said to be suitable for thermal insulation). These methods, however, will lead to non-flexible materials and/or mechanically weak compounds. Foamed pure rubbers with better mechanical and general properties in CR are quite rare; in some cases the CR (among other polymers and fillers) is just used as a massive rubber base and the foam is only formed in contact with flame (so-called intumescences, as in DE 4135678, UA 61419, UA 78131), in other cases the manufacturing of the foam is very complicated and costly, as it is done using polymerization (JP 6041341, however, flame retardant properties are not even mentioned) or by using both a complicated formulation and expansion method (JP 60186543 and JP 60186544; based on critical chemicals such as isocyanate).

It is known from the above stated patent literature that chloroprene containing formulations can be used to improve flame resistance properties, but those formulations generate high levels of smoke which is seen as the most severe threat for humans in case of fire. Even less works have been done on flame retardant insulating materials, especially thermal insulation compounds: JP 10077478 mentions a compound (where CR is a possible ingredient) which will give an insulation effect against flame spread during fire by formation of water vapour, whereas JP 1182030 mentions a foamed CR for wetsuits achieving the insulation properties by low-conductive filler. However, a suitable flame retardant flexible foam material for industrial as well as for general (e.g. building) insulation and shielding/damping purposes can not be obtained by any of the above mentioned state of the art technologies, especially in regard to the fact that flame retardant and protective properties are required and get more severe in all public sectors: new challenges have come up such as the harmonization of European standards concerning building and construction insulation (EN 13823, "Euroclasses"); these standards do not only require a general flame retardancy, but include severe testing conditions ("SBI round corner test") and add additional obstacles for norm fulfillment by introducing parameters such as flame and smoke generation and smoke density.

SUMMARY OF THE INVENTION

In accordance with one embodiment, an expandable and crosslinkable elastomeric material contains 50 to 100 percent by weight of polychloroprene based on the total polymer content and more than 25 percent by weight of chloroparaffin based on the total polymer content.

DETAILED DESCRIPTION OF THE INVENTION

A major object of the present invention thus is to provide a foamed rubber material not showing the above mentioned deficiencies but exhibiting both easy, i.e. economic and ecologic, manufacturing and handling (e.g. in mounting), showing excellent insulation properties and fulfilling the modern regulations in the respective application fields by a high level of immanent flame retardancy, low flame spread and low smoke density levels.

Surprisingly, it is found that such a versatile elastomeric foam material not showing the above mentioned disadvantages can be made directly from chloroprene rubber in a very limited number of steps by compounding it with chloroparaffin and different kinds and levels of fillers, and by expanding and crosslinking it.

The claimed material contains compound (A), which is a chloroprene rubber (polychloroprene, CR), and which can be present in the formulation to a minimum level of 50 weight percent, based on the total polymer content.

The polychloropene rubber can be chosen from the group of sulphur-, xanthogen- or mercaptan-modified types, especially preferred are mercaptan modified types. The polychloroprene can be used with Mooney-viscosities (ML1+4 at 100° C.) from 25 to 125 Mooney units, especially preferred from 35 to 45 Mooney units.

The claimed material furthermore contains compound (B) which is chloroparaffin (chlorinated paraffin) of all possible chain lengths and molecular weight of a level of more than 25 weight %, calculated based on 100 weight % of the total polymer content. A preferred chain length is from $C_8$-$C_{50}$. Especially preferred are chain lengths from $C_{17}$-$C_{27}$. The chloroparaffin can exhibit chlorine levels from 10 to 80%, preferably from 48 to 72%.

The claimed material includes one or more fillers (C), which may be chosen from the classes of both active and inactive fillers, such as metal and non metal oxides, carbon black, metal hydroxides, silica, carbonates, and so on and mixtures thereof. Especially preferred are fillers of the class of metal hydroxides, metal carbonates, and metal oxides. The filler(s) (C) may be contained to an extent of 50-800 weight %, preferably 100-500 weight %, especially preferred 200-400 weight %, calculated based on 100 weight % of the total polymer content.

The claimed material contains a suitable crosslinking system (D), such as sulphur-based systems, irradiation, peroxides, or mixtures thereof. Preferred are sulphur based crosslinking systems containing sulphur and all kind of organic accelerators used in rubber industry. Especially preferred are mixtures of sulphur, pipentamethylenethiuram tetrasulfide, zinc-N-dibenzyl-dithiocarbamate, N,N'-diphenyl thiourea, ethylene thiourea and dibenzothiazyl disulfide.

The claimed material furthermore contains a suitable foaming system (E), which can lead to the formation of open and closed-cell as well as mixed-cell structures. Preferred are closed-cell structures forming additives. The foaming system (E) can either consist of chemicals forming gases at defined temperatures or can be a physical foaming system which will bring the gases (such as nitrogen, carbon dioxide, vapours) into the compound by mechanical methods, e.g. pressure, as well as of mixtures of both methods. Chemicals (E) for the expansion may be $CO_2$ releasing chemicals (e.g. carbonates, carbamates, carbonamides etc.), water or water releasing compounds (including crystalline and interchalate water), nitrogen releasing chemicals (e.g. azo compounds, azides, hydrazides), expanding microspheres and hollow spheres in general, containing expandable gases or liquids, expanding clays and graphites and similar particles, and so on, and any mixtures thereof.

The claimed material furthermore may contain flame retardant agents (F) and mixtures thereof, as used in the rubber and plastics industry, such as halogen compounds, metal oxides and hydroxides, metal sulfides, phosphor and phosphor based compounds, melamine based compounds and mixtures thereof. A preferred class of flame retardant agents would be brominated organics which can be combined with synergists like antimony trioxide.

The claimed material may contain plasticizers (G) to improve its compounding and manufacturing properties in a range of 0-200 weight %, calculated based on 100 weight % of the total polymer content.

The elastomeric compositions useful in the present invention may be prepared by any conventional procedure such as for example, by mixing the ingredients in an internal mixer or on a mill.

The claimed material furthermore may contain any additive (H) for improving its manufacturing, application, aspect and performance properties, such as inhibitors, retarders, accelerators, stabilizers (e.g. heat, UV), colours etc. Additives (H) can also be chosen of the class of intumescence additives, such as expanding graphite, vermiculite, perlite etc., to render the material self-intumescent in case of fire to close and protect e.g. wall and bulkhead penetrations. Additives (H) can also consist of substances that will lead to a self-ceramifying effect to protect cables, pipes, wall penetrations etc. in case of fire, such as boron compounds, silicon containing compounds etc.

The claimed material may contain additional polymers or polymer compounds (I) that can be mixed with the rubber compound to obtain a rubber or rubber/plastics blend, such as organic rubbers, silicones, thermoplastic elastomers, thermoplasts and thermosets, and mixtures thereof.

The claimed material may furthermore contain fibres or chopped fibres or pulp as both filler material (C) and reinforcing agent (J), such as glass fibres, polyaramid fibres, polyester fibres and so on, and mixtures thereof, A major advantage of the claimed material is its suitability for "Euroclass" applications where low flame spread and low smoke generation are required (see Table 3, FIGRA/SMOGRA), and that this suitability is immanent to the material, means, it is not achieved by external means, but is generated by the formulation itself.

A further advantage of the claimed material is that no brominated flame retardants are needed to achieve demanded flame resistance. Brominated flame retardants are critical for environmental issues and can generate toxic fumes in case of fire. For that reasons brominated flame retardants are already partially prohibited.

A basic advantage of the claimed material is the fact that in its preferred compositions it is free of both fibres and PVC, both of them being under survey and being discussed for environmental and health issues.

A further advantage of the claimed material is that phthalates are not needed as plasticizers, which are partially under discussion and partially prohibited already for the same reason.

A further advantage of the claimed material is the possibility to adapt its properties to the desired property profile (concerning mechanics, damping, insulation etc.) by expanding it to an appropriate foam cell structure from totally open-cell to totally closed-cell. This can be achieved by modifying the crosslinking system(s), the foaming agent(s) and the base matrix.

A further advantage of the claimed material is the fact that it can be crosslinked by widespread and economic methods like both sulphur and peroxide curing due to the fact that with chloroprene an appropriate polymer has been chosen.

It is a prominent advantage of the claimed material that it can be produced in an economic way in a one-step mixing and a one-step shaping process, e.g. by moulding, extrusion and other shaping methods. It shows versatility in possibilities of manufacturing and application. It can be extruded, co-extruded, laminated, moulded, co-moulded etc. as single item or multilayer and thus it can be applied in unrestricted shaping onto various surfaces in automotive, transport, aeronautics, building and construction, furniture, machinery engineering and many other industries.

It is a further advantage of the claimed material that it can be transformed and given shape by standard methods being widespread in the industry and that it does not require specialized equipment.

A further advantage of the claimed material is the fact that it is easily colourable in contrast to e.g. existing insulation materials that are mainly black.

An important advantage of the claimed material is the fact that it is low gassing, which is both important for e.g. automotive applications, but also for flame retardancy in general.

Another advantage of the material is the fact that it can be blended or filled with or contain scrapped or recycled material of the same kind to a very high extent not losing its fire retardant or other relevant properties significantly.

A further advantage of the claimed material is its suitability for thermal insulation applications, ranging from very low ($-100°$ C.) to very high ($150°$ C.) temperatures by choosing the proper compound.

An important advantage of the claimed material for its application is the fact that it can be glued, coated etc. easily and even with polychloroprene rubber and/or latex based glues/coating that show flame retardancy themselves and thus would not render the applied material's fire protection properties worse.

A major advantage of the claimed material is the fact that its fire retardancy is immanent, thus contained in the material itself and not brought to the material by any other means. This will facilitate both modification, adaptation and variation of the material without losing important properties.

A resulting major advantage of the claimed material is the fact that it can be surface treated, e.g. coated, welded, braided etc. with various agents and by various means. By these means the fire retardancy can be pushed to even higher levels if properly applied.

Examples

In the following examples and comparative examples, elastomer processing was carried out in the following manner: processing was done in an internal mixer having an inner volume of 5000 cubic centimeters; kneading was carried out at approximately 30 rpm. The batches were processed as two pass mixes. In the first pass, all ingredients except the sulphur, accelerators and activator were added to the internal mixer and mixed to a temperature of about $135°$ C., dumped, milled and cooled to ambient temperature. In the second pass, the master batch compound was mixed together with sulphur, accelerators and activator to $105°$ C., dumped, milled and cooled to ambient temperature.

The final process was carried out on a laboratory extruder with screw diameter of 37.25 mm and screw length of 25 D. The extruder was equipped with vacuum port and tube die. The extruded tube was cut directly after extrusion and spread to a sheet before to be transferred into the oven line.

The expansion and vulcanisation of the extruded compound was carried out on a continuous oven line starting from 120° C. and step-by-step increasing to 180° C. Table 1 illustrates the elastomeric composition formulations for test samples for Examples 4, 5 and 6 of the present invention, and for Comparative Examples 1, 2 and 3.

TABLE 1

Chemical composition: declaration of ingredients are calculated based on 100 weight % of total polymer content

| | Comparative Example 1 | Comparative Example 2 | Comparative Example 3 | Example 4 | Example 5 | Example 6 |
|---|---|---|---|---|---|---|
| Polychloroprene | | 83.30 | 95.00 | 79.20 | 83.40 | 83.40 |
| Poly-nitril-butadiene-rubber | 47.60 | | | | | |
| Poly-vinyl-chloride | 52.40 | 16.70 | | | | |
| Polybutadien | | | 5.00 | 4.20 | | |
| Silicone resin | | | | 16.60 | 8.30 | |
| Copolyester | | | | | 8.30 | |
| Ethylene-Vinylacetate | | | | | | 16.60 |
| Aluminium Trihydroxide | 63.80 | 41.70 | 150.00 | 156.60 | 166.60 | 166.60 |
| CarbonBlack | 11.00 | 25.00 | 30.00 | | | |
| Calciumcarbonate | 56.20 | 41.70 | | | | |
| Chloroparaffin | 56.20 | 45.80 | | 45.80 | 45.80 | 45.80 |
| Antimony trioxide | 6.20 | 5.70 | 12.00 | 3.30 | 1.70 | 1.70 |
| Di-isononylphthalate | 11.40 | | | | | |
| Diphenyl-kresylphosphate | | | 42.00 | | | |
| Dekabromo-diphenylether | 12.40 | 21.60 | | | | |
| Zinc borate | | 11.70 | | | | |
| Azodicarbonamide | 43.30 | 33.30 | 38.00 | 33.30 | 39.20 | 39.20 |
| Zinc oxide | 2.40 | 0.42 | 0.50 | 0.42 | 0.42 | 0.42 |
| Sulphur | 0.20 | 0.42 | 0.50 | 0.42 | 0.42 | 0.42 |
| Dipentamethylene thiuramtetrasulfid | 0.26 | | | | | |
| Zinc dibutyl dithiocarbamate | | 0.14 | 0.17 | 0.14 | 0.14 | 0.14 |
| Ethylene thiourea | | 0.16 | 0.19 | 0.16 | 0.16 | 0.16 |
| Zinc dimethyl dithiocarbamate | 0.46 | | | | | |

Table 2 describes used raw materials and sources thereof

TABLE 2

Used chemicals

| Chemical | Trade name | Supplier |
|---|---|---|
| Polychloroprene | Denka M-30 | Denki Kagaku Kogyo Kabushiki Kaischa |
| Polynitril-butadien-rubber | Nipol DN 300 W 80 | Zeon Chemicals |
| Poly-vinyl-chloride | Evipol SH 5730 | Ineos |
| Polybutadiene | BR 9000 | NGS Elastomer GmbH |
| Silicon resin | Resin Modifier 4-7081 | Dow Corning |
| Copolyester | Griltex P-1533 EP | EMS-Griltech |
| Ethylen-Vinylacetat | Elvax 250 | DuPont Elastomers |
| Aluminium Trihydroxide | Martinal 107 LE | Martinswerk GmbH |
| Carbon Black | Nhumo N 660 | NHumo |
| Calciumcarbonate | Omya BSH | Omya |
| Chloroparaffin | Chlorparaffin 137 | Leuna Tenside GmbH |
| Antimony Trioxide | Antimontrioxid | GMS-Chemie Handelsgesellschaft m.b.H. |
| Di-Isononylphtalate | Palatinol N | BASF |
| Diphenyl-kresylphosphate | Disflamoll DPK | Lanxess |
| Dekabromo-diphenylether | Saytex 102 E | Albemarle |
| Zinc borate | ZB 467 | Great Lakes Manufaturing Ltd |
| Azodicarbonamide | Tracel K 3/95 | Tramaco |
| Sulfur | Rubersul 700 | Nasika Products S.A. |
| Dipentamethylenethiuram | Nasika DPTT-70 | Nasika Products S.A. |
| Tetrasulfide | | |
| Zinc-Dibutyldithiocarbamate | Nasika ZDBC-75 | Nasika Products S.A. |
| EthyleneThiourea | Nasika ETU-75 | Nasika Products S.A. |
| Zinc diethyldithiocarbamate | nasika ZDEC-70 | Nasika Products S.A. |

Physical tests were conducted for all compounds after processing, expansion and vulcanisation. Properties of the resulting foams (sheets) were measured according to the following test protocols:

Density by ISO 845; LOI by ISO 4589; Thermal Conductivity by EN 12667; Flammability and determination of Total Heat Release (THR), Fire Growth Rate (FIGRA), Smoke Growth Rate (SMOGRA) and Total Smoke Production (TSP) by EN 13823; Flammability Classification in accordance with EN 13501. Table 3 illustrates analytical data, especially from fire testing.

TABLE 3

Physical data

| | Comparative Example 1 | Comparative Example 2 | Comparative Example 3 | Example 4 | Example 5 | Example 6 |
|---|---|---|---|---|---|---|
| Wall Thickness (Sheets) | 25 mm | 25 mm | 25 mm | 25 mm | 25 mm | 25 mm |
| Density [kg/m3] | 46 | 82 | 80 | 75 | 76 | 73 |
| LOI | 39.2 | 53.7 | 39.9 | 59.0 | 59.3 | 59.2 |
| Thermal Conductivity at 0° C. [W/mK] | 0.034 | 0.038 | 0.038 | 0.037 | 0.035 | 0.036 |
| THR [MJ] | 3.7 | 2.5 | 1.9 | 2.1 | 1.4 | 1.2 |
| FIGRA [W/s] | 221 | 55 | 179 | 107 | 96 | 85 |
| SMOGRA [m2/s] | 1980 | 1300 | 615 | 172 | 164 | 142 |
| TSP [m2] | 316 | 260 | 199 | 85 | 111 | 83 |
| Classification | C-S3-d0 | B-S3-d0 | C-S3-d0 | B-S2-d0 | B-S2-d0 | B-S2-d0 |

We claim:

1. An expandable and crosslinkable elastomeric material containing a minimum level of 50 percent by weight of polychloroprene based on the total polymer content and more than 25 percent by weight of chloroparaffin based on the total polymer content, wherein said material is cross-linked.

2. The material according to claim 1 wherein the polychloroprene can be blended with up to 50 percent by weight based on the weight of the polychloroprene with one or several additional elastomeric or thermoplastic materials.

3. The material according to claim 1 which is expanded to a foam with mainly closed cells.

4. The material according to claim 1 which is expanded to a final density of less than 200 kg/m3.

5. The material according to claim 1 which contains fillers and additives.

6. The material according to claim 5 which is vulcanized and expanded.

7. A process for manufacturing the material according to claim 6 characterized in that it comprises a one-step-mixing process for mixing said elastomeric material and a one-step-shaping process in which said material is vulcanized and expanded.

8. A method for protection of a structure comprising applying the material according to claim 6 to said structure.

9. A method for protection of a structure against temperature, comprising applying the material according to claim 6 to said structure.

10. A method for protection of a structure against noise, comprising applying the material according to claim 6 to said structure.

11. A method of treatment comprising applying the material according to claim 6 to a structure so as to affect at least one of thermal insulation, acoustic insulation, acoustic damping or vibration damping, of said structure.

12. A method for thermal insulation, comprising applying the material according to claim 6 to at least one of an inside or outside of a structure, a vessel, a container, a pipe, a wall, a tank, a tube or a duct.

13. A process for manufacturing the material according to claim 1 that comprises a one-step-mixing process comprising mixing said elastomeric material.

* * * * *